United States Patent [19]

Fox et al.

[11] 4,281,394

[45] Jul. 28, 1981

[54] MONITORING AND SIGNALLING SYSTEM INCLUDING APPARATUS FOR PROCESSING BINARY SIGNALS HAVING MULTIPLE MESSAGES

[75] Inventors: Jeffrey R. Fox, Concord; Arthur Margolies, Ashland; Rob Moolenbeek, Dover; Martin L. Resnick, Chestnut Hill, all of Mass.

[73] Assignee: GTE Laboratories Incorporated, Waltham, Mass.

[21] Appl. No.: 94,015

[22] Filed: Nov. 14, 1979

[51] Int. Cl.[3] .................... G06F 11/08; G06F 11/30

[52] U.S. Cl. .................................... 364/900

[58] Field of Search ... 364/200 MS File, 900 MS File; 179/5 P; 340/526, 539

[56] References Cited

U.S. PATENT DOCUMENTS

| | | | |
|---|---|---|---|
| 3,340,515 | 9/1967 | Little | 364/900 |
| 3,566,365 | 2/1971 | Rawson et al. | 364/200 |
| 3,566,370 | 2/1971 | Worthington, Jr. et al. | 364/900 |
| 3,651,484 | 3/1972 | Smeallie | 364/200 |
| 3,662,111 | 5/1972 | Rubinstein | 179/5 P |
| 3,757,315 | 9/1973 | Birchfield | 340/539 |
| 3,803,579 | 4/1974 | Compton | 340/526 |
| 3,833,895 | 9/1974 | Fecteau | 340/539 |
| 3,843,841 | 10/1974 | Rubinstein | 179/5 P |
| 3,885,235 | 5/1975 | Bergstrom | 340/526 |
| 3,925,763 | 12/1975 | Wadhwani | 340/539 |
| 3,989,900 | 11/1976 | Dibner | 179/5 P |
| 4,057,790 | 11/1977 | Fleming | 340/539 |
| 4,095,211 | 6/1978 | Shaughnessy | 340/539 |

OTHER PUBLICATIONS

*When Seconds Are Crucial,* Life Alert Brochure; three pp. (undated); Brash Industries.

Lifeline Brochure, Marketing Technologies Corp.; two pp. (undated); Canton, Ohio.

*Microalert Saves Lives,* Microalert Systems International Brochure; Burbank, Calif.; 1977; 3 pp.

*Communications Revolution-New Products with Old Fashioned Marketing Techniques,* L. G. Lindsay; 3/79; SDM-pp. 20-21.

*Here's a New World for Your Central Station-Triton,* NAPCO Security Systems, Copiague, N.Y., SDM 6/79; p. 81.

*An Invention to Benefit Old and Handicapped People*-AWA Alarm System, 17 pp., (undated).

AWA Alarm System, (Brochure)-1/76, 11 pp.

*Primary Examiner*—Harvey E. Springborn
*Attorney, Agent, or Firm*—Peter Xiarhos

[57] ABSTRACT

Apparatus for a monitoring and signalling system such as a home health care system includes a plurality of sensors operative to monitor the occurrence of activities performed by an individual in his or her residence and to produce binary coded signals indicative of the occurrence of the monitored activities. Each signal comprises six successive identical messages within a one-second interval, with each message including a binary word identifying the monitoring and signalling system, the particular sensor originating the signal, and the nature of the monitored activity. Each message further includes a preamble and a pair of interwords on opposite sides of the binary word.

The apparatus in accordance with the invention includes a microprocessor which operates to repetitively sample each signal originating with a sensor to determine the binary content of the signal and to extract a binary word from a message while rejecting preambles, interwords and "glitches" (noise) present in the signal. The extracted binary word is then tested as to its satisfaction of predetermined requirements. If the binary word of one message satisfies these requirements, an interval of time is established during which a binary word of the next message is required to be extracted from the next message and also satisfy the predetermined requirements before permitting further processing of the second binary word.

25 Claims, 66 Drawing Figures

(sheet 1 of 2)

(sheet 2 of 2)

MONITORING AND SIGNALLING SYSTEM INCLUDING APPARATUS FOR PROCESSING BINARY SIGNALS HAVING MULTIPLE MESSAGES

CROSS-REFERENCE TO RELATED APPLICATIONS

The present application discloses subject matter which is disclosed, and claimed, in the following co-pending applications:

Ser. No. 965,808, filed Dec. 4, 1978, now U.S. Pat. No. 4,224,478 in the names of Robert J. Fahey and Martin L. Resnick, entitled "DATA TRANSMISSION CIRCUIT", and assigned to GTE Sylvania Incorporated and GTE Laboratories Incorporated;

Ser. No. 965,809, filed Dec. 4, 1978, now U.S. Pat. No. 4,220,825, in the name of Robert J. Fahey, entitled "TELEPHONE STATUS MONITOR CIRCUIT", and assigned to GTE Sylvania Incorporated;

Ser. No. 965,756, filed Dec. 4, 1978, now U.S. Pat. No. 4,224,602, in the names of Richard W. Anderson and Alfred I. Bottner, entitled "SIGNALLING DEVICE", and assigned to GTE Sylvania Incorporated;

Ser. No. 973,201, filed Dec. 26, 1978, now U.S. Pat. No. 4,220,872, in the name of Robert J. Fahey, entitled "D.C. POWER SUPPLY CIRCUIT", and assigned to GTE Sylvania Incorporated;

Ser. No. 973,218, filed Dec. 26, 1978, now U.S. Pat. No. 4,225,792, in the name of Robert J. Fahey, entitled "DETECTOR CIRCUIT", and assigned to GTE Sylvania Incorporated;

Ser. No. 75,782, filed Sept. 17, 1979, in the name of Richard L. Naugle, entitled "SENSING APPARATUS", and assigned to GTE Laboratories Incorporated;

Ser. No. 75,769, filed Sept. 17, 1979, in the names of Richard L. Naugle and William L. Geller, entitled "EXIT-ENTRY APPARATUS", and assigned to GTE Laboratories Incorporated;

Ser. No. 094,242, filed concurrently herewith, in the names of Robert J. Fahey and Martin L. Resnick, entitled "APPARATUS FOR MONITORING AND SIGNALLING SYSTEM", and assigned to GTE Sylvania Incorporated and GTE Laboratories Incorporated;

Ser. No. 094,018, filed concurrently herewith, in the names of Richard W. Anderson, J. Edward Schlener and Martin L. Resnick, entitled "APPARATUS FOR MONITORING AND SIGNALLING SYSTEM", and assigned to GTE Sylvania Incorporated and GTE Laboratories Incorporated;

Ser. No. 094,013, filed concurrently herewith, in the names of Richard W. Anderson and J. Edward Schlener, entitled "APPARATUS FOR MONITORING AND SIGNALLING SYSTEM", and assigned to GTE Sylvania Incorporated;

Ser. No. 094,012, filed concurrently herewith, in the names or Robert J. Fahey and Martin L. Resnick, entitled "TELEPHONE STATUS MONITOR APPARATUS", and assigned to GTE Sylvania Incorporated and GTE Laboratories Incorporated;

Ser. No. 094,014, filed concurrently herewith, in the names of Robert J. Fahey and Martin L. Resnick, entitled "APPARATUS FOR MONITORING USAGE OF A TELEPHONE", and assigned to GTE Sylvania Incorporated and GTE Laboratories Incorporated;

Ser. No. 094,245, filed concurrently herewith, in the names of Robert A. Norbedo and Martin L. Resnick, entitled "APPARATUS FOR SIGNALLING SYSTEM", and assigned to GTE Laboratories Incorporated;

Ser. No. 094,241, filed concurrently herewith, in the name of Martin L. Resnick, entitled "DATA PROCESSING APPARATUS FOR RECEIVING AND PROCESSING CODED WORDS", and assigned to GTE Laboratories Incorporated;

Ser. No. 094,016, filed concurrently herewith, in the names of Richard W. Anderson, Robert J. Fahey, William R. McClellan, and J. Edward Schlener, entitled "MONITORING AND SIGNALLING SYSTEM", and assigned to GTE Sylvania Incorporated;

Ser. No. 094,017, filed concurrently herewith, in the names of Hans G. Blank and Martin L. Resnick, entitled "APPARATUS FOR COMMUNICATING WITH PROCESSING APPARATUS OVER A TELEPHONE NETWORK", and assigned to GTE Laboratories Incorporated;

Ser. No. 094,243, filed concurrently herewith, in the names of Robert J. Fahey and Robert A. Norbedo, entitled "APPARATUS FOR SIGNALLING SYSTEM", and assigned to GTE Sylvania Incorporated and GTE Laboratories Incorporated;

Ser. No. 094,019, filed concurrently herewith, in the names of Robert J. Fahey, Robert A. Norbedo and J. Edward Schlener, entitled "APPARATUS FOR MONITORING AND SIGNALLING SYSTEM", and assigned to GTE Sylvania Incorporated and GTE Laboratories Incorporated;

Ser. No. 094,244, filed concurrently herewith, in the names of Robert J. Fahey and Robert A. Norbedo, entitled "APPARATUS FOR SIGNALLING SYSTEM", and assigned to GTE Sylvania Incorporated and GTE Laboratories Incorporated; and Ser. No. 094,246, filed concurrently herewith, in the names of Robert J. Fahey, Robert A. Norbedo and Martin L. Resnick, entitled "VARIABLE TIMING SYSTEM", and assigned to GTE Sylvania Incorporated and GTE Laboratories Incorporated.

The following co-pending applications are directed to apparatus which may be employed in the signalling and monitoring system of the present invention:

Ser. No. 75,783, filed Sept. 17, 1979, in the names of Jeffrey R. Fox, Arthur Margolies, and Rob Moolenbeek, entitled "ELECTRICAL POWER SUPPLY APPARATUS", and assigned to GTE Laboratories Incorporated; and Ser. No. 084,976, filed Oct. 15, 1979, in the name of William L. Geller, entitled "DIGITAL COMMUNICATIONS RECEIVER", and assigned to GTE Laboratories Incorporated.

BACKGROUND OF THE INVENTION

The present invention relates to a monitoring and signalling system. More particularly, the present invention relates to a monitoring and signalling system such as a home health care system for monitoring the activities of individuals within their own homes, apartments, etc., and for providing bi-directional communication between these locations and a centralized communications center.

In recent years, as the general population has become older and the number of elderly persons in the population has increased, and also as a result of increased social welfare legislation directed to the needs of these persons, there has been an increased reliance and utilization of professional care institutions such as hospitals, nursing homes and retirement centers for providing health care and maintenance for these individuals. A large majority of these individuals are maintained and cared for in such institutions for good and proper reasons, most typically for the treatment of medical problems requiring medical facilities and equipment and the professional services of doctors, nurses and the like. However, there are a number of individuals who are presently maintained in institutions without medical reason. These individuals generally have no family or friends to care for them or who do not wish to impose upon or burden such family or friends and are prepared to sacrifice some measure of independence for the security and freedom from worry, anxiety, and loneliness that institutions can provide. It has therefore been recognized that if alternatives to institutionalization can be provided, especially for those individuals who do not require constant or continuing institutional attention or observation, while providing a substantial degree of security and independence for these individuals, preferably within their own homes, the burdens on the institutional care system can be reduced and result in lower health care costs. Any such alternatives which would also produce the same results for individuals other than the elderly, such as young handicapped, disabled or infirm adults, would also have the effect of improving the quality of life of such individuals and, at the same time, reducing health care costs.

A variety of apparatus and systems have been proposed heretofore directed to solutions to the problems as discussed hereinabove. One such system, developed in Sweden, is described in U.S. Pat. No. 3,885,235 and is adapted to monitor passively normal, routine activities of an individual in his or her own residence and to produce alarm conditions in the event these routine activities are not performed during some specified period of time, for example, a period of up to 24 hours. The system as described in the patent includes a plurality of actuating units which may be variously located in predetermined areas of the residence, such as halls, lavatories, bathrooms and bedrooms, and which may be associated with apparatus likely to be actuated or used routinely by the individual during the normal course of the day. This apparatus may include, by way of example, lighting circuits, radio sets, television sets and household appliances. Actuation or use of any one of the actuating units during the aforesaid specific time period will cause an electromechanical timer set to this time period to be reset and to repeat its timing cycle. In the event no actuating unit is actuated or used during the time period, for example, due to inactivity or incapacity of the individual, the timer times out after the time period and an alarm condition, for example, in the form of an audible or visual alarm, is produced by the system indicative of this situation. If the alarm condition was produced as the result of inactivity rather than incapacity, the user may disable the system by the use of a master switch. The master switch may also be used to disable the system when the individual leaves his or her residence for a prolonged period of time, for example, for a period of time greater than the time period of the timer. Upon return of the individual, the system is arranged so that routine operation of any one of the actuating units will have the effect of resetting the timer and causing the timer to repeat its timing cycle. The system as described above may also include an alarm switch in the residence for use by the individual in producing alarm conditions during emergencies, such as medical emergencies or accidents.

In a later version of the system as described in the aforementioned U.S. Pat. No. 3,885,235, known as the "Automatic Warning Aid (AWA)", additional features are provided, including a direction sensitive photocell optics arrangement in the bathroom; an electronic timer having two time periods, specifically, a short time period associated with the bathroom optics arrangement and a longer time period associated with all other actuating units; a pre-alarm cycle effective prior to an actual alarm cycle and during which an alarm condition can be cancelled or aborted; and remote alarm transmission. In this later system, recognition is given to the fact that the majority of accidents occur in the bathroom. Accordingly, the system is arranged so that when an individual enters the bathroom the direction sensitive photocell arrangement detects this entry and causes the timing cycle of the electronic timer to be reduced to its short time period, for example, about one hour. If the individual does not exit within the one hour period, for example, due to incapacity or inactivity of the individual, a pre-alarm cycle will be initiated and, if the pre-alarm cycle is not terminated or aborted by the individual, an actual alarm cycle will be initiated after passage of a short period of time (e.g., about ½ hour). In the event the individual exits from the bathroom within the one hour period, the direction sensitive photocell arrangement will detect this exit and cause the timing cycle of the electronic timer to be set or returned to its longer time cycle, for example, about 8 hours. During any pre-alarm cycle caused by non-use of any of the actuating units within the individual's residence the individual may, unless incapacitated, abort or cancel the pre-alarm cycle by actuation or use of any actuating unit (which resets the timer) so that no actual alarm condition will be produced. The alarm condition may be generated locally or, if desired, transmitted over a telephone network, for example, in the form of a recorded message, to a central alarm center from which communication with the individual may be attempted and/or help sent or summoned.

Another system which has been proposed heretofore for passively monitoring the activities of individuals within their own residences and for producing appropriate alarm conditions is described in U.S. Pat. No. 3,989,900. In this system, the use of a standard telephone is monitored. Each time the handset of the telephone is lifted off or removed from the cradle of the telephone, for example, during the making and receiving of routine telephone calls, a timer set to cycle through a predetermined time period, for example, up to 24 hours, is caused to be reset and to repeat its timing cycle. So long as the telephone is used during the time period of the timer no alarm condition will be produced. If no use of the telephone is made during the time period of the timer, for example, due to incapacity or inactivity of the individual, a local alarm condition is produced and, simultaneously therewith, a magnetic tape player is actuated to dial continuously a plurality of telephone numbers of locations at which help may be available and to transmit a prerecorded message that help is needed at the address of the individual. If the timing out of the timer was due to inactivity rather than incapacity, the user may, in response to the local alarm condition, abort the alarm condition and data transmission sequence (within a time period of about 90 seconds) by simply lifting and replacing the handset back on the cradle of the telephone thereby resetting the timer. This latter operation may also be used to reset the timer at such time as the individual plans to leave his residence for a period of time less than the predetermined time period of the timer. An activating switch is also provided in the system for activation of the alarm condition in the case of emergencies. The abovementioned patent also contemplates the use of a high speed digital dialer and transmitter in place of the aforementioned magnetic tape player. In this case, the timing out of the timer will produce a local alarm condition and, unless the alarm sequence is aborted (for example, within a 5 minute period), the digital dialer and transmitter will operate to seize a telephone line to establish communication with the central station. The dialing of the central station continues until a receiving signal has been received from the central station whereupon an identification signal can be sent to the central station.

In still other systems which have been proposed heretofore for enabling individuals to be maintained within their own residences while providing appropriate alarm signalling in emergency or accident situations, a transmitter is employed by an individual to communicate under a variety of conditions with control apparatus located on the premises. The transmitter, which may be in the form of a small, portable hand held unit or a unit carried in a pocket or purse or attached to clothing or worn as a pendant (e.g., see U.S. Pat. Nos. 4,121,160 and 4,134,108), may be used by the individual to communicate with the control apparatus in a variety of situations, including emergency or accident situations, to respond to periodic check signals or stimuli from the control apparatus as an indication that "all is well" (e.g., see U.S. Pat. No. 3,662,111), or to respond within predetermined time periods of timer apparatus. The signals from the transmitter are typically coded rf signals employed to control circuitry within the control apparatus. Activation of a transmitter in an emergency or accident situation, or failure to activate a transmitter at required times, for example, due to incapacity or inactivity, will ordinarily cause an alarm cycle to be initiated which, if not aborted or cancelled by the individual, will cause an alarm sequence to be initiated for informing others of the emergency, accident or inactivity situation. The alarm sequence may be variously initiated by digital or tape dialers and include one or more messages, identification data, etc., to be communicated, for example, over a telephone network, to such organizations or individuals as an emergency center, the police or fire department, ambulance service, doctors, paramedics, rescue teams, relatives, friends or neighbors. In many systems, repeated attempts will be made to communicate alarm information to a central location using one or more telephone numbers, and some systems may include handshaking operations between a local control unit and central equipment and include test calls for determining proper functioning of the systems.

While the various systems as described above are useful to a degree in alleviating the problems of individuals living alone, they all have serious shortcomings and disadvantages which limit their effectiveness and usefulness. As a group, for example, these systems utilize simple data handling, processing and communication techniques, being limited more or less to tape and digital dialing, the transmission and reception of limited amounts of data, and, in some cases, simple handshaking and parity-checking operations. It is not known, for example, that any of these systems employ computers, microprocessors, or the like capable of performing significant and substantial data processing, either within the residences of individuals or at central locations. As a result, these systems are susceptible to a high false alarm rate and reliability problems, these latter problems being especially exascerbated in those systems employing mechanical tape dialers and electromechanical timers and the like. In these systems, therefore, due to the lack of sophisticated data processing and communications, there is inadequate guarantee, if any, that a successful and satisfactory transmission of data, such as alarm conditions or information, has been achieved so that those persons charged with acting on this information can adequately discharge their duties. The systems as described above, perhaps also as a result of their limited data processing and communications capabilities, have limited capability in detecting or pinpointing, and distinguishing between, the malfunction of various critical components thereof, for example, actuating units, control apparatus or telephone lines. In these systems, the malfunction of a critical component thereof will, assuming that such malfunction is somehow communicated to a responsible person (e.g., as a result of an alarm condition), ordinarily require service personnel to enter a person's home and check out the entire system or a major part thereof to pinpoint the particular source of trouble or malfunction. Further, in those systems employing timers having one or more resettable time periods (e.g., a one-hour bathroom cycle and/or a regular 8-hour cycle), these time periods are alterable only within the residences of individuals, thereby requiring costly service calls by service personnel to effect the alterations. The alteration of timer periods only within the residences of individuals can also have the effect of increasing the chances of tampering by these individuals.

In addition to the abovementioned general shortcomings and disadvantages, the systems as described hereinabove have other and more specific shortcomings and disadvantages which limit their effectiveness and usefulness in a home health care environment. For example, in the Swedish systems the multiple actuating units and the alarm switches are hard-wired to the control units. This hard-wiring operation makes the installations of these systems complex, time-consuming and expensive. In addition, while using several diverse "passive" actuating units, the Swedish systems do not make use of a common passive actuating unit generally available and used frequently in most residences, namely, the telephone. While the systems described in U.S. Pat. No. 3,989,900 employ a telephone as a passive actuating unit, no other passive actuating units are employed, thereby reducing the scope of monitoring of the activities of individuals. In addition, only on/hook to off/hook transitions of the telephone are used to reset the timer in the control unit. Thus, at the conclusion of a telephone conversation the off/hook to on/hook transition resulting from the individual replacing the handset on the cradle of the telephone will not reset the timer, thereby having the probable effect of increasing the alarm rate of the system. In the case of the systems employing rf transmitters for transmitting alarm conditions or responding to predetermined check signals, these systems similarly do not employ passive actuating units and thereby have a reduced scope of monitoring of the activities of individuals and, therefore, a reduced effectiveness.

BRIEF SUMMARY OF THE INVENTION

In accordance with the present invention, apparatus is provided for a monitoring and signalling system such as a home health care system as described hereinabove. The apparatus in accordance with the invention generally includes a sensor means and a processing means. The sensor means is operative to monitor the occurrence of a particular activity and in response thereto to produce a binary coded signal including a predetermined number of messages in succession within a predetermined first fixed period of time. Each of the messages includes a binary word and successive ones of the binary words have an interword therebetween.

The processing means operates to receive and process the binary coded signal produced by the sensor means. The processing means includes means operative to detect the bits of messages of the coded signal and in response to detecting bits of first and second values to place bits of those values into a data storage means provided for this purpose. The processing means further includes means operative to detect an interword in the coded signal and in response thereto to examine the data storage means to determine the presence in the data storage means of a predetermined quantity of data related to the number of bits of a binary word in a message. A test means operates if the data storage means contains the predetermined quantity of data therein as derived from the processing of one message of the coded signal to test the data as to its satisfaction of predetermined requirements for acceptance of the data. If the data satisfies the predetermined requirements, the test means operates to establish a predetermined second fixed period of time within which like data of the next succeeding message of the coded signal must be derived from the next succeeding message and satisfy the predetermined requirements for acceptance of the data.

BRIEF DESCRIPTION OF THE DRAWING

Various objects, features and advantages of a monitoring and signalling system in accordance with the present invention will be had from a detailed discussion taken in conjunction with the accompanying drawing in which.

DETAILED DESCRIPTION OF THE INVENTION

Figure 1:
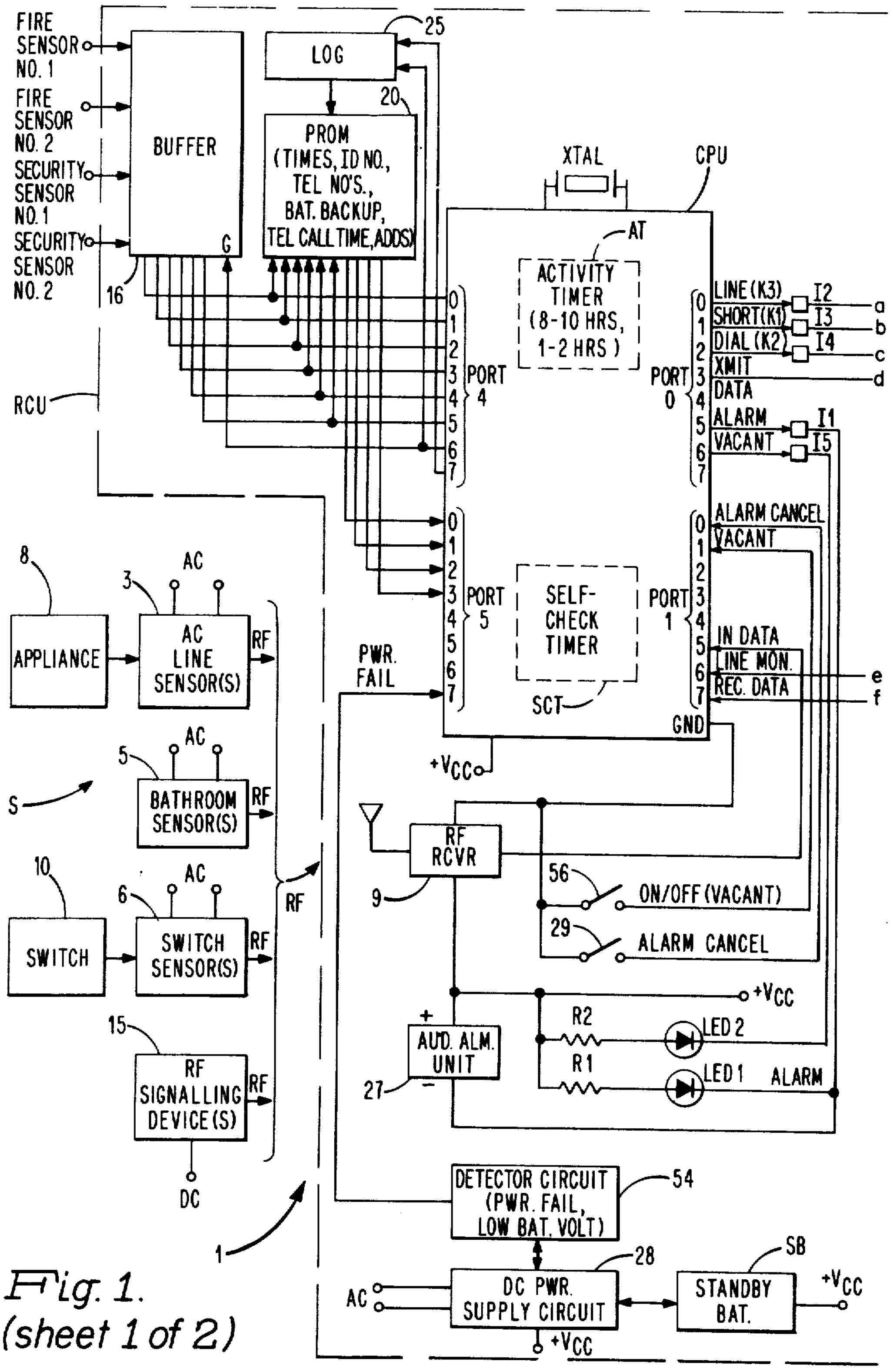
FIG. 1 is a schematic block diagram of a monitoring and signalling system in accordance with the present invention.
Figure 1:
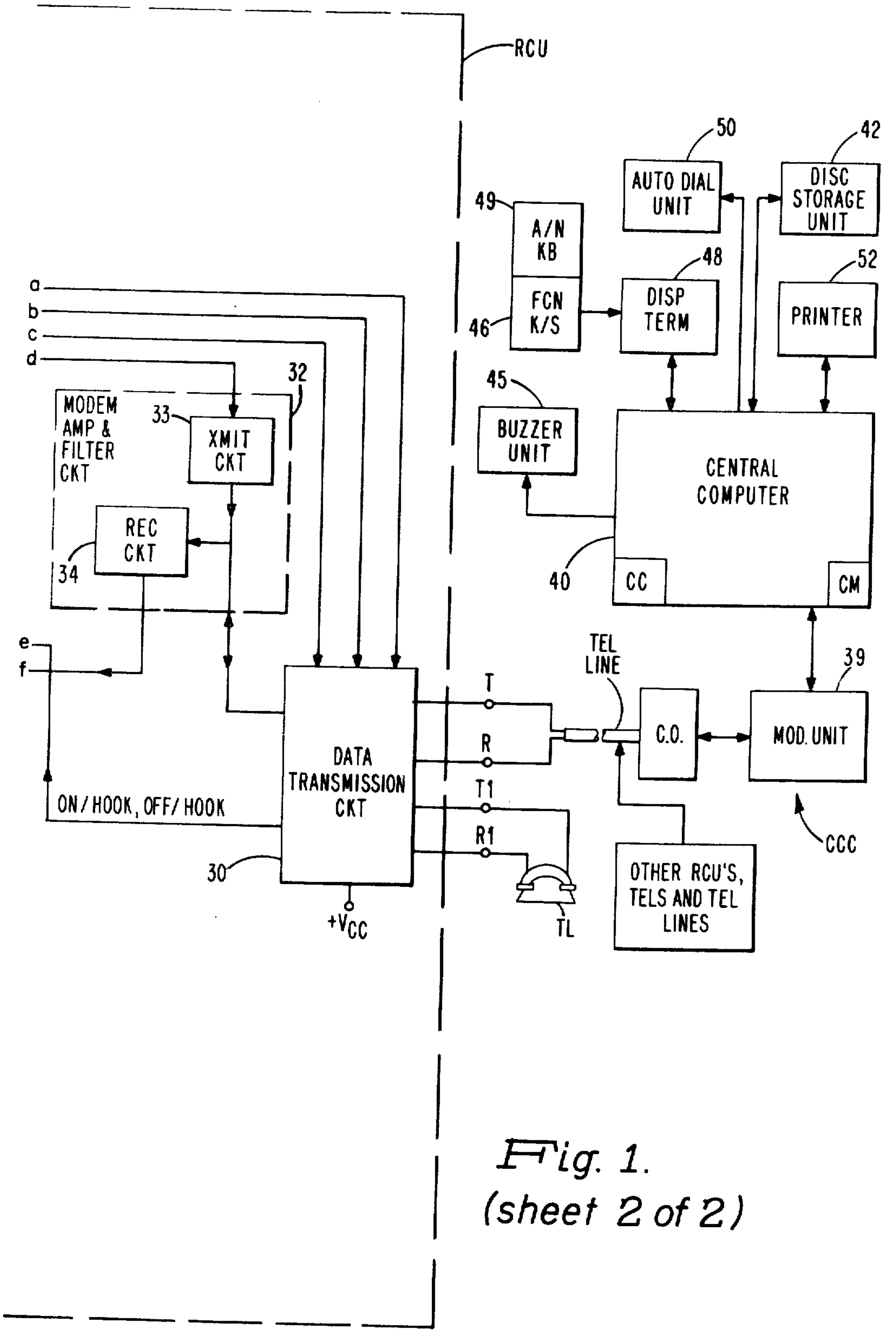

The present invention is described in detail in co-pending patent application Ser. No. 094,017, filed Nov. 14, 1979 in the names of Hans G. Blank and Martin L. Resnick. The following portions of that co-pending application are incorporated herein by reference:

(a) FIGS. 2–66 are the corresponding brief description thereof under the heading "BRIEF DESCRIPTION OF THE DRAWING"; and (b) The entire portion of the specification following the heading "DETAILED DESCRIPTION OF THE INVENTION".

What is claimed is:

1. In a monitoring and signalling system, apparatus comprising:

sensor means operative to monitor the occurrence of a particular activity and in response thereto to produce a binary coded signal including a predetermined number of messages in succession within a predetermined first fixed period of time, each of said messages including a binary word, and successive ones of the binary words having an interword therebetween; and processing means operative to receive and process the binary coded signal produced by the sensor means, said processing means comprising:

(a) data storage means for storing bits of data;

(b) means operative to detect the bits of messages of the coded signal and operative in response to detecting a bit of a first logic value to place a bit of that value in the data storage means, and operative in response to detecting a bit of a second logic value to place a bit of that value in the data storage means;

(c) means operative to detect in interword in the coded signal and in response thereto to examine the data storage means to determine the presence in the data storage means of a predetermined quantity of data related to the number of bits of a binary word in a message; and (d) test means operative if the data storage means contains the predetermined quantity of data therein as derived from the processing of one message of the coded signal to test the data as to its satisfaction of predetermined requirements for acceptance of the data and, if the data satisfies the predetermined requirements, to establish a predetermined second fixed period of time within which like data of the next succeeding message of the coded signal must be derived from the next succeeding message and satisfy the predetermined requirements for acceptance of the data.

2. Apparatus in accordance with claim 1 comprising:

identification storage means adapted to store binary data identifying the system;

and wherein:

the binary word of each message of the coded signal produced by the sensor means includes binary data identifying the system and binary dta related to the other data in the word for achieving a particular system of parity for the word;

said test means being operative if the data storage means contains the predetermined quantity of data therein following the occurrence of an interword to determine if the data in the data storage means satisfies the particular system of parity and, if the data in the data storage means does satisfy the particular system of parity, to obtain from the identification storage means the binary system identification data and to compare this data with predetermined bits of the data stored in the data storage means, said test means being operative if the copared data is the same to initiate the predetermined second fixed period of time within which data of the next succeeding message of the coded signal must be derived from the next succeeding message, stored in the data storage means, and satisfy the parity and system identification requirements.

3. Apparatus in accordance with claim 2 wherein:

the binary word of each message of the coded signal produced by the sensor means further includes binary data identifying the sensor means producing the coded signal and binary data specifying the nature of the activity monitored by the sensor means;

said apparatus further comprising:

sensor identification storage means for storing sensor identification data;

activity storage means for storing activity data; and means operative if data in the data storage means is derived from the second message of a pair of successive messages and satisfies the parity and system identification requirements within the predetermined second fixed period of time to transfer predetermined data in the data storage means corresponding to the sensor identification data of a binary word to the sensor identification storage means and to transfer other data in the data storage means corresponding to the activity data of a binary word of the activity storage means.

4. Apparatus in accordance with claim 3 wherein:

the predetermined first fixed period of time within which the messages of the coded signal are produced by the sensor means is less than the predetermined second fixed period of time within which the data in the data storage means derived from the second one of a pair of successive messages must satisfy the parity and system identification requirements; and the predetermined quantity of data in the data storage means is equal to the number of bits in a binary word of a message.

5. Apparatus in accordance with claim 4 wherein:

the sensor means includes transmitting means operative to transmit the binary coded signal in an rf coded format; and the processing means includes receiver means operative to receive and detect the rf binary coded signal to provide the coded signal in a digital format.

6. In a monitoring and signalling system apparatus comprising:

a plurality of sensor means each operative to monitor the occurrence of a particular corresponding activity and in response thereto to produce a corresponding binary coded signal including a predetermined number of messages in succession within a predetermined first fixed period of time, each of said messages including a binary word comprising data identifying the system, data identifying the sensor means producing the coded signal, data specifying the nature of the activity monitored by the sensor means, and data related to the other data in the word for achieving a particular system of parity for the word, successive ones of the binary words in each coded signal having an interword therebetween;

processing means operative to receive and process binary coded signals produced by the plurality of sensor means, said processing means comprising:

(a) identification storage means adapted to store binary data identifying the system;

(b) data storage means for storing bits of data;

(c) means operative to detet the bits of messages of coded signals produced by the plurality of sensor means and operative in response to detecting a bit of a first logic value to place a bit of that value in the data storage means, and operative in response to detecting a bit of a second logic value to place a bit of that value in the data storage means;

(d) means operative to detect interwords in coded signals produced by the plurality of sensor means and operative in response to detecting an interword in a coded signal to examine the data storage means to determine the presence therein of a predetermined quantity of data related to the number of bits of a binary word;

(e) means operative if the data storage means contains the predetermined quantity of data therein following the detection of an interword to determined if the data in the data storage means satisfies the particular system of parity and, if the data in the data storage means does satisfy the particular system of parity, to obtain from the identification storage means the binary system identification data and to compare this data with predetermined data stored in the data storage means and corresponding to binary system identification data in a binary word, said means being operative if the compared data is the same to initiate a predetermined second fixed period of time within which data of the next succeeding message of the same coded signal must be derived from the next succeeding message, stored in the data storage means, and satisfy the parity and system identification requirements;

(f) sensor identification storage means for storing sensor identification data;

(g) activity storage means for storing activity data; and (h) means operative if data in the data storage means is derived from the second message of a pair of successive messages of a coded signal and satisfies the parity and system identification requirements within the predetermined second fixed period of time to transfer predetermined data in the data storage means corresponding to the sensor identification data of a binary word to the sensor identification storage means and to transfer other data in the data storage means corresponding to the activity data of a binary word to the activity storage means.

7. Apparatus in accordance with claim 6 wherein:

the predetermined first fixed period of time within which the messages of coded signals are produced by the plurality of sensor means is less than the predetermined second fixed period of time within which data in the data storage means derived from the second one of a pair of successive messages in a coded signal must satisfy the parity and system identification requirements; and the predetermined quantity of data in the data storage means is equal to the number of bits in a binary word of a message.

8. Apparatus in accordance with claim 7 wherein:

each of the plurality of sensor means includes associated transmitted means operative to transmit the associated binary coded signal in an rf coded format; and the processing means includes receiver means operative to receive and detect each rf binary coded signal to provide the coded signal in a digital format.

9. In a monitoring and signalling system, apparatus comprising:

sensor means operative to monitor the occurrence of a particular activity and in response thereto to produce a coded signal including a predetermined number of messages within a predetermined first fixed period of time, each of said messages including a binary word comprising bits of first and second widths representing first and second logic values, and successive ones of the binary words having an interword therebetween of a predetermined width different from the first and second widths; and processing means operative to receive and process the coded signal produced by the sensor means, said processing means comprising:

(a) means operative to repetitively sample the signal and compare the values of succcessive samples to determine the occurrence of transitions;

(b) means operative to count the number of samples following each transition;

(c) data storage means for storing bits of data;

(d) count analyzing means operative to examine the counts of the number of samples following transitions in the coded signal and operative when a given count between successive transitions is within a predetermined first range corresponding to a bit of the first logic value to place a bit of that value in the data storage means, and operative when a count between successive transitions is within a predetermined second range corresponding to a bit of the second logic value to place a bit of that value in the data storage means, and further operative when a count is within a predetermined third range corresponding to an interword to examine the data storage means to determine the presence therein of a predetermined quantity of data related to the number of bits in a binary word; and (3) test means operative if the data storage meand contains the predetermined quantity of data therein as derived from the processing of one message of the coded signal to test the data as to its satisfaction of predetermined requirements for acceptance of the data and, if the data satisfies the predetermined requirements, to establish a predetermined second fixed period of time within which like data of the next succeeding message of the coded signal must be derived from the next succeeding message, stored in the data storage means, and satisfy the predetermined requirements for acceptance of the data.

10. Apparatus in accordance with claim 9 wherein:

the count analyzing means is further operative when a count examined thereby is within a predetermined fourth range corresponding to a glitch or noise to adjust the previous count to effectively reflect the non-occurrence of the glitch or noise.

11. Apparatus in accordance with claim 10 wherein the count analyzing means comprises:

first and second storage means operative to respectively store first and second ones of successive counts of the number of samples following successive transitions in the coded signal; and means operative if the second one of the successive counts in the second storage means is within the predetermined fourth range corresponding to a glitch or noise to add that count together with a count corresponding to the present sample to the first count in the first storage means, thereby to adjust the first count in the first storage means to effectively reflect the non-occurrence of the glitch or noise.

12. Apparatus in accordance with claim 9 wherein the count analyzing means comprises:

means operative when a count of samples between successive transitions in the coded signal is between the first and second ranges or between the second and third ranges to reject the signal to which the count corresponds.

13. Apparatus in accordance with claim 12 wherein:

the first width of a bit of the coded signal representing the first logic value is less than the second width of a bit of the coded signal representing the second logic value;

the first range of counts is less than the second range of counts;

the width of an interword is greater than the first and second width of bits; and the third range of counts is greater than the second range of counts.

14. Apparatus in accordance with claim 13 wherein:

the count analyzing means is further operative when a count examined thereby is within a predetermined fourth range corresponding to a glitch to adjust the previous count to effectively reflect the non-occurrence of the glitch;

said fourth range being less than the first, second and third ranges.

15. Apparatus in accordance with claim 14 comprising:

identification storage means adapted to store binary data identifying the system;

and wherein:

the binary word of each message of the coded signal produced by the sensor means includes binary data identifying the system and binary data related to the other data in the word for achieving a particular system of parity for the word;

said test means being operative if the data storage means contains the predetermined quantity of data therein following the occurrence of an interword to determine if the data in the data storage means satisfies the particular system of parity and, if the data in the data storage means does satisfy the particular system of parity, to obtain from the identification storage means the binary system identification data and to compare this data with predetermined bits of the data stored in the data storage means, said test means being operative if the compared data is the same to initiate the predetermined second fixed period of time within which data of the next succeeding message of the coded signal must be derived from the next succeeding message, stored in the data storage means, and satisfy the parity and system identification requirements.

16. Apparatus in accordance with claim 15 wherein:

the binary word of each message of the coded signal produced by the sensor means further includes binary data identifying the sensor means producing the coded signal and binary data specifying the nature of the activity monitored by the sensor means;

said apparatus further comprising:

sensor identification storage means for storing sensor identification data;

activity storage means for storing activity data; and means operative if data in the data storage means is derived from the second message of a pair of successive messages and satisfies the parity and system identification requirements within the predetermined second fixed period of time to transfer predetermined data in the data storage means corresponding to the sensor identification data of a binary word to the sensor identification storage means and to transfer other data in the data storage means corresponding to the activity data of a binary word to the activity storage means.

17. Apparatus in accordance with claim 16 wherein:

the predetermined first fixed period of time within which the messages of the coded signal are produced by the sensor means is less than the predetermined second fixed period of time within which the data in the data storage means derived from the second one of a pair of successive messages must satisfy the parity and system identification requirements; and the predetermined quantity of data in the data storage means is equal to the number of bits in a binary word of a message.

18. Apparatus in accordance with claim 17 wherein:

the sensor means includes transmitting means operative to transmit the binary coded signal in an rf coded format; and the processing means includes receiver means operative to receive and detect the rf binary coded signal to provide the coded signal in a digital format.

19. In a monitoring and signalling system, apparatus comprising:

a plurality of sensor means each operative to monitor the occurrence of a particular corresponding activity and in response thereto to produce a corresponding binary coded signal including a predetermined number of messages in succession within a predetermined first fixed period of time, each of said messages including a binary word comprising data identifying the system, data identifying the sensor means producing the coded signal, data specifying the nature of the activity monitored by the sensor means, and data related to the other data in the word for achieving a particular system of parity for the word, said data including bits of first and second widths representing first and second logic values, successive ones of the binary words in each coded signal having an interword therebetween of a predetermined width different from the first and second widths; and processing means operative to receive and process binary coded signals produced by the plurality of sensor means, said processing means comprising:

(a) identification storage means adapted to store binary data identifying the system;

(b) data storage means for storing bits of data;

(c) means operative to repetitively sample the coded signals produced by the plurality of sensor means and to compare the values of successive samples to determine the occurrence of transitions;

(d) means operative to count the number of samples following each transaction in a coded signal;

(e) count analyzing means operative to examine the counts of the number of samples following transitions in the coded signals and operative when a given count between successive transitions in a coded signal is within a predetermined first range corresponding to a bit of the first width and logic value to place a bit of that logic value in the data storage means, and operative when a count between successive transitions in a coded signal is within a predetermined second range corresponding to the second width and logic value to place a bit of that logic value in the data storage means, and further operative when a count is within a predetermined third range corresponding to an interword to examine the data storage means to determine the presence therein of a predetermined quantity of data related to the number of bits in a binary word;

(f) means operative if the data storage means contains the predetermined quantity of data therein following the occurrence of an interword to determine if the data storage means satisfies the particular system of parity and, if the data in the data storage means does satisfy the particular system of parity, to obtain from the identification storage means the binary system identification data and to compare this data with predetermined data stored in the data storage means and corresponding to binary system identification data in a binary word, said means being operative if the compared data is the same to initiate a predetermined second fixed period of time within which data of the next succeeding message of the same coded signal must be derived from the next succeeding message, stored in the data storage means, and satisfy the parity and system identification requirements;

(g) sensor identification storage means for storing sensor identification data;

(h) activity storage means for storing activity data; and (i) means operative if data is derived from the second message of a pair of successive messages of the same coded signal, stored in the data storage means, and satisfies the parity and system identification requirements within the predetermined second fixed period of time to transfer predetermined data in the data storage means corresponding to the sensor identification data of a binary word to the sensor identification storage means and to transfer other data in the data storage means corresponding to the activity data of a binary word to the activity storage means.

20. Apparatus in accordance with claim 19 wherein:

the count analyzing means is further operative when a count examined thereby is within a predetermined fourth range corresponding to a glitch or noise to adjust the previous count to effectively reflect the non-occurrence of the glitch or noise.

21. Apparatus in accordance with claim 20 wherein:

the count analyzing means comprises:

first and second storage means operative to respectively store first and second ones of successive counts of the number of samples following successive transitions in the coded signal; and means operative if the second one of the successive counts in the second storage means is within the predetermined fourth range corresponding to a glitch or noise to add that count together with a count corresponding to the present sample to the first count in the first storage means, thereby to adjust the first count in the first storage means to effectively reflect the non-occurrence of the glitch or noise.

22. Apparatus in accordance with claim 21 wherein the count analyzing means comprises:

means operative when a count of samples between successive transitions in a coded signal is between the first and second ranges or between the second and third ranges to reject the signal to which the count corresponds.

23. Apparatus in accordance with claim 22 wherein: the first width of a bit of a coded signal representing the first logic value is less than the second width of a bit of a coded signal representing the second logic value;
the first range of counts is less than the second range of counts;
the width of an interword is greater than the first and second width of bits; and
the third range of counts is greater than the second range of counts.

24. Apparatus in accordance with claim 23 wherein: the predetermined first fixed period of time within which the messages of coded signals are produced by the plurality of sensor means is less than the predetermined second fixed period of time within which data in the data storage means derived from the second one of a pair of successive messages in a coded signal must satisfy the parity and system identification requirements; and
the predetermined quantity of data in the data storage means is equal to the number of bits in a binary word of a message.

25. Apparatus in accordance with claim 24 wherein: each of the plurality of sensor means includes associated transmitting means operative to transmit the associated binary coded signal in an rf coded format; and
the processing means includes receiver means operative to receive and detect each rf binary coded signal to provide the coded signal in a digital format.

* * * * *